United States Patent [19]

Busch et al.

[11] Patent Number: 4,562,224

[45] Date of Patent: Dec. 31, 1985

[54] CHLOROPOLYETHYLENE, PROCESS FOR THE MANUFACTURE THEREOF AND ITS USE

[75] Inventors: Wolfram Busch, Hochheim am Main; Johannes Brandrup, Wiesbaden; Dietrich Fleischer, Darmstadt, all of Fed. Rep. of Germany

[73] Assignee: Hoechst Aktiengesellschaft, Fed. Rep. of Germany

[21] Appl. No.: 553,690

[22] Filed: Nov. 21, 1983

[30] Foreign Application Priority Data

Nov. 23, 1982 [DE] Fed. Rep. of Germany ....... 3243249

[51] Int. Cl.[4] .................................................. C08F 8/22
[52] U.S. Cl. ..................................... 524/519; 524/576; 525/214; 525/334.1; 525/358
[58] Field of Search .............................. 525/334.1, 214; 524/519, 576

[56] References Cited

U.S. PATENT DOCUMENTS

| Re. 29,350 | 1/1976 | Schoen | 525/334.1 |
| 3,165,560 | 1/1965 | Frey et al. | 525/334.1 |
| 3,282,910 | 11/1966 | Klug et al. | 260/94.9 |
| 3,454,544 | 7/1969 | Young et al. | 260/88.2 |
| 3,759,888 | 9/1973 | Nose et al. | 525/334.1 |
| 3,790,548 | 2/1974 | Trieschmann et al. | 525/334.1 |
| 4,113,805 | 9/1978 | Frey et al. | 525/334.1 |
| 4,440,925 | 4/1984 | Ohorodnik et al. | 528/487 |

FOREIGN PATENT DOCUMENTS

| 0058311 | 8/1982 | European Pat. Off. . |
| 1495518 | 4/1969 | Fed. Rep. of Germany . |
| 2260525 | 12/1975 | Fed. Rep. of Germany . |
| 1407159 | 9/1975 | United Kingdom . |

*Primary Examiner*—Paul R. Michl
*Assistant Examiner*—Bernard Lipman
*Attorney, Agent, or Firm*—Connolly and Hutz

[57] ABSTRACT

The invention provides finely dispersed, agglomeration-free chloropolyethylene having good rubber and anti-blocking properties. The invention provides furthermore a process for the manufacture of such a chloropolyethylene, according to which chlorination of the starting polyethylene is carried out in the presence of a dispersing agent system of poly-N-vinylprrolidone and hydrophobic silicic acid. This process allows also the use of polyethylene types having a pronounced tendency to agglomeration.

7 Claims, No Drawings

CHLOROPOLYETHYLENE, PROCESS FOR THE MANUFACTURE THEREOF AND ITS USE

Depending on the structure, chloropolyethylene can be applied as thermoplastic or chemically cross-linked rubber, as elasticizer for rigid PVC, as polymeric plasticizer for plasticized PVC, as flow auxiliary, as polymer carrier for masterbatches, as varnish coat etc. Desirable for such application fields is a chloropolyethylene having a substantially fine grain without coarse agglomerates, and a substantially low surface hardness. A large amount of fine grain improves considerably the mixability with polymers and inorganic or organic additives such as fillers, plasticizers, stabilizers etc. and prevents disintegration of such systems on transport and processing. Moreover, the dissolution time of products applied in the varnish field is considerably reduced. Furthermore, blocking of the chloropolyethylene particles, that is, possible clogging under transport and storage conditions, is substantially inhibited.

The problem, however, resides in the fact that good chlorination of the polyethylene required for obtaining good rubber properties incites simultaneously particle agglomeration during the chlorination and thus reduces the amount of fine grain.

Many attempts have been made to prevent or reduce the particle agglomeration of the polyethylene during the chlorination. Thus, German Auslegeschrift No. 2,005,751 discloses a process according to which a high-quality, finely dispersed chloropolyethylene is said to be obtained by special reaction conditions and use of protective colloids. In this process, the polyethylene is chlorinated at a temperature below its upper melting point in a first step, subsequently, in the second step, it is tempered at a temperature above the lower melting point, and the remaining chlorine is reacted in the third step at a temperature below that of the tempering step. Despite the use of protective colloids, for example polyacrylic acid or a copolymer of maleic anhydride and methylvinyl ether, and polyacrylamide, particle agglomeration is either not prevented or insufficiently only. Moreover, a product is obtained the Shore hardness of which is too high for certain application fields such as use as rubber or film and sheet material.

When according to German Offenlegungsschrift No. 2,260,525 concentrated hydrochloric acid is used instead of an aqueous neutral chlorination liquor, the particle agglomeration is considerably reduced; nevertheless, agglomeration at a particle diameter of far more than 3 mm still occurs when the starting polyethylene has an average diameter of 0.4 mm. The addition of silicic acid and silicone oil as described in this Offenlegungsschrift likewise does not prevent particle agglomeration; merely a defined size of the agglomerated chloropolyethylene particles can be adjusted.

Finely dispersed inorganic or organic additives, for example titanium dioxide and carbon black according to German Offenlegungsschrift No. 1,495,518 or talcum according to U.S. Pat. No. 3,454,544 are partially efficient only, cause product discoloration, and prejudice further processing due to their influence on viscosity and abrasion behavior.

The use of protective colloids for inhibiting particle agglomeration during the chlorination is described for example in Published Japanese Patent Application No. 72-07,455. For this purpose, homo- or copolymers of vinyl-N-pyrrolidone are proposed. Although the intended aim is attained in this way, considerable disadvantages have to be encountered on the other hand, such as a product discoloration which in the practice nearly cannot be tolerated. Moreover, the products so obtained can be dried in an uneconomic manner only because the moisture content is very high after the chlorination. Furthermore, the surface of this chloropolyethylene is too hard, so that an application as soft rubber is seriously handicapped. It is therefore the object of the present invention to provide a chloropolyethylene which is free from the disadvantages of the state of the art, especially practically free from agglomerations, has a low surface hardness, pronounced rubber properties, sufficient antiblocking behavior, and is sufficiently stable to light. It is furthermore the object of the present invention to provide an appropriate process for the manufacture of such a chloropolyethylene.

Surprisingly, such a polyethylene is obtained by carrying out the chlorination in the presence of a combination of a poly-N-vinylpyrrolidone and hydrophobic silicic acid.

The invention provides therefore a practically agglomeration-free chloropolyethylene having an average molecular weight $\overline{M}_w$ of from $3.3 \times 10^4$ to $12 \times 10^6$, a chlorine content of from 10 to 50 weight %, a residual crystallinity of from 0 to 40%, a surface hardness of from 35° (Shore A) to 55° (Shore D), an impact resilience of from 5 to 40%, and an average particle size of from 150 to 500 μm, wherein the average particle diameter of the chloropolyethylene differs from that of the starting polyethylene by 15% at most.

Subject of the invention is furthermore a process for the manufacture of finely dispersed, practically agglomeration-free chloropolyethylene by chlorination of polyethylene in aqueous phase in the presence of a dispersing agent, which comprises using as dispersing agent a combination of poly-N-vinylpyrrolidone and hydrophobic silicic acid.

Further subjects of the invention are indicated in the Patent Claims.

The chloropolyethylene of the invention has preferably an average molecular weight $\overline{M}_w$ of from $6 \times 10^4$ to $5 \times 10^5$, a chlorine content of preferably 25 to 45 weight %, a residual crystallinity of preferably 0 to 30%, especially 0 to 20%, measured according to the differential thermoanalysis method. Furthermore, the surface hardness according to Shore A (German Industrial Standard DIN 53 505) is preferably from 40° to 80°, and the impact resilience (German Industrial Standard DIN 53 512) is preferably from 10 to 35%. The average grain size of the chloropolyethylene powder is preferably from 150 to 300 μm, it differs from that of the starting polyethylene by a maximum 15%, preferably a maximum 3 to 15%, especially a maximum 4 to 12%.

Even without a content of the specific combination of additives according to German Offenlegungsschrift No. 2,913,855, the chloropolyethylene of the invention has good anti-blocking properties in addition to the low degree of surface hardness and the high rubber elasticity.

The chloropolyethylene of the invention is distinguished particularly by being substantially free from agglomerations, so that the average particle diameters of chlorination product and starting product vary only slightly, so that the first one does not exceed the latter on by a maximum 15%, preferably a maximum 12%. The portion of agglomerates is a maximum 10%, preferably a maximum 5%, especially a maximum 3%.

This substantial freedom from agglomerations is practically independent of the mode of chlorination, for example at elevated temperature for the manufacture of amorphous rubber-like types, or at moderate temperatures obtaining partially crystalline products.

Remarkable are furthermore other product properties obtained by the practically agglomeration-free chlorination of polyethylene according to the invention, especially in the case of chloropolyethylenes without residual crystallinity and a chlorine content of from 30 to 45%. In accordance with the invention, very low surface hardness degrees are surprisingly obtained; for example, the surface hardness of 65° according to Shore A drops to 51° (values obtained in comparative tests without dispersing agent or with only one of the two dispersing agents as claimed).

On the other hand, the impact resilience (German Industrial Standard DIN 53 512) as a measure for the rubber behavior is increased from 18 to 28% when using the dispersing agent system according to the invention.

The high fineness of the grain has considerable advantages with respect to homogeneity and stability of mixtures with other polymers. As is known, mere shocks and shaking motions on transport may cause disintegration which may be increased on processing. These phenomena result in unacceptable alterations of the properties of the final products with respect to, for example, dimensional stability and mechanical criteria. When, however, adapting the grain size of the chloropolyethylene to that of the second polymer component, for example polyethylene, polypropylene, or PVC, which can be obtained by correspondingly choosing the grain distribution of an appropriate polyethylene type, the disintegration phenomena as described are considerably reduced or even fully inhibited.

The chloropolyethylene of the invention may contain usual additives such as stabilizers, antioxidants, UV stabilizers, pigments, dyestuffs, fillers, processing agents etc. as they are described for example in German Offenlegungsschrift No. 2,456,278, U.S. Pat. No. 3,641,216 or H. Kainer, Polyvinylchlorid und Vinylchlorid-Mischpolymerisate, Ed. Springer Berlin, Heidelberg, New York (1965), pp. 209–258 and 275–329.

The poly-N-vinylpyrrolidone used according to the invention as one dispersing agent component, which can be added to the chlorination liquor in solid or dissolved form is easily soluble in water and acids, and has generally an average molecular weight (viscosity average) of 2,500 to 800,000, preferably 10,000 to 100,000, corresponding to a K-value of 10 to 120, preferably 20 to 100 (K-value according to Fikentscher, Cellulosechemie 13 (1932), p. 58, in this case measured at 20° C. in a 1% aqueous solution).

By poly-N-vinylpyrrolidone, there are to be understood in this case especially the homopolymers of N1-vinyl-2-pyrrolidone and N1-vinyl-3-methyl-2-pyrrolidone. Suitable in accordance with the invention are furthermore water-soluble or acid-soluble copolymers of particularly the above pyrrolidones with monomers copolymerizable therewith, such as (meth)acrylic acid or the salts or esters thereof (preferably $C_1$–$C_6$-alkyl in the alcohol component), vinyl esters, such as vinyl acetate, vinyl esters etc.; the amount of comonomer units in the copolymer being up to 20 weight %, preferably up to 10 weight % (relative to the total polymer). The use of homo-N-1-vinyl-2-pyrrolidone is preferred in accordance with the invention.

Normally, the poly-N-vinylpyrrolidone is added to the chlorination batch in an amount of from 0.01 to 2, preferably 0.02 to 1, and especially 0.02 to 0.6, weight %, relative to the polyethylene. In the case of polyethylenes having a wide molecular weight range and a large specific surface, which especially tend to agglomeration, and when simultaneously operating at chlorination temperatures of above 130° C., it is recommended to use an amount of poly-N-vinylpyrrolidone near the upper limit of the quantitaties indicated above.

The other dispersing agent component according to the invention, that is, hydrophobic silicic acid, is generally used in amounts of from 0.05 to 5, preferably 0.1 to 1.0, weigth %, relative to the polyethylene. Likewise, an amount near the upper limit is recommended for polyethylene types tending particularly to agglomeration, and in the case of elevated chlorination temperatures. The quantitative ratio of poly-N-vinylpyrrolidone to hydrophobic silicic acid is advantageously from 1:20 to 10:1, preferably 1:10 to 5:1. This preferred range is especially recommended for the above critical cases.

By hydrophobic silicic acid, there is to be understood in this context a silicic acid, that is, pyrophorically obtained silicic acid or precipitated silicic acid, which is hydrophobized in known manner. For example, the corresponding silicic acid which generally should have a primary particle size of 5 to 100, preferably 10 to 35, nm (corresponding to a specific surface according to BET of 50 to 500 m²/g), is impregnated wiht silane compounds, for example dimethyldichlorosilane ($(CH_3)_2Cl_2Si$) or trimethylchlorosilane ($(CH_3)_3ClSi$); the amount of silane compound being preferably 1 to 2 weight %. The silane compound may be used directly when it is liquid, or otherwise in dissolved form. The impregnated acid is subsequently after-treated at elevated temperature, for example at about 400° C. This operation mode is for example described in H. Brümmer, D. Schutte, Chemiker-Zeitung/Chemische Apparatur 89 (1965), p. 437.

The hydrophobic properties of a silicic acid so obtained become manifest by a reduced absorption of moisture which is about 1/5 to 1/20 of the non-hydrophobized material (see for example the leaflet of DEGUSSA company: "Hydrophobiertes ®Aerosil"). The drying loss after heating for 2 hours at 105° C. (German Industrial Standard DIN 55 921) is generally 2 to 3 weight %.

The silicic acid may alternatively be hydrophobized by silication or so ta say in situ during the chlorination by adding the silicic acid and the silicone oil to the chlorination batch. By organo-silicon compounds named silicone oil in technical language there are to be understood especially polysiloxanes based on the repeated unit having the following formula

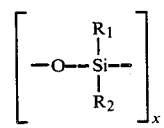

in which $R_1$ and $R_2$ are alkyl having preferably from 1 to 12 carbon atoms, aryl having preferably from 6 to 10 carbon atoms, or aralkyl having from 7 to 12 carbon atoms, and x is a number of from 10 to 10,000, preferably 50 to 500. Examples are dimethyl, diethyl, dipropyl, methyl ether, dioctyl, dihexyl, methylpropyl, dibutyl and didodecyl polysiloxanes.

Preferred are the dimethyl polysiloxanes. The molecular weight is generally from 165 to 100,000, preferably 10,000 to 30,000, and the kinetic viscosity is from 0.65 to 100,000 mm²/s, preferably 100 to 1,000 mm²/s. When hydrophobizing with silicone oil, the ratio of precipitated or phyrophoric silicic acid to silicone oil is generally from 100:1 to 1:1, preferably 5 to 10:1 (parts by weight).

The particle size range of the hydrophobic (hydrophobized) silicic acid is identical to that of the primary particles.

The chlorination process of the invention is carried out for the rest under conditions known per se. Thus, water serves at reaction medium, optionally with electrolyte additives such as $CaCl_2$, or hydrochloric acid, the acid concentration being generally from 5 to 35, preferably 5 to 20, percent. The quantitative ratio of polyethylene to chlorination liquor (which may contain further usual additives such as wetting agents) is generally from 1:5 to 1:20, depending on the controllability of the reaction and the possibilities for dissipating the reaction heat. Normally, the chlorination in accordance with the inventionn is carried out without using initiators; in some cases, however, the presence of such compounds, for example persulfates or peroxides, may be advantageous. Optionally, the reaction may be initiated by high-energy radiation or by light.

Suitable starting materials for the chlorination are in principle all polyethylenes; the average molecular $\overline{M}_w$ thereof being generally in the range of from $3 \times 10^4$ to 6 to $10^6$, preferably $4 \times 10^4$ to $3 \times 10^5$, and the molecular weight distribution ($\overline{M}_w/\overline{M}_n$) from 2 to 30, preferably 5 to 20. Preferably, polyethylenes stemming from the low pressure or medium pressure synthsis according to the Ziegler process or Phillips process (especially the first process) are used in accordance with the invention. By polyethylene, there are to be understood in this context also copolymers of ethylene and up to 20 weight % of comonomers such as propene, butene-1,4-methylpentane-1, -hexene-1, octene-1.

The melt flow index MFI 190/5 of such products is advantageously from 0.01 to 50 g/10 min, the reduced specific viscosity (0.1 to 0.03% solution in decahydronaphthalene at 135° C.) is from 1.3 to 25 dl/g, the density ranges from 0.91 to 0.97. The maximum melting temperature is above 100° C. and mostly 115° to 140° C.

The particle size of the polyethylene used is not critical for the process of the invention. However, since a substantially finely dispersed chloropolyethylene is intended in accordance with the invention, the starting material, too, should be very fine-grained. Therefore, polyethylene types can be chlorinated which have an average grain diameter of 105 μm only. On the other hand, for certain fields larger grain diameters, for example of 400 μm and more, are known to be required. The usual range of particle size is from 10 to 500 μm. In certain cases it may be advantageous to use a high-density polyethylene which is tempered or presintered in known manner for preferably 5 to 300 minutes at a temperature ranging from 100° C. to the crystallite melting pount (see German Offenlegungsschrift No. 1,720,800).

Under certain conditions it is recommended to suspend the polyethylene in known manner before the chlorination reaction, in which operation the addition of small amounts of highly active wetting agents is very efficient. Suitable wetting agents are the anionic, cationic or nonionic compounds commonly used for this application; the latter ones being preferred, such as derivatives of fatty acids, fatty amines, fatty acid amides, or homopolymeric propylene oxide, copolymers of propylene oxide and ethylene oxide, alkylarylpolyglycol ethers etc. In this operation, the dispersing agents according to the invention may already be added to the polyethylene suspension. The poly-N-vinylpyrrolidone soluble in water and acids may be dosed in in any form, that is, either as solution or as solid matter to be dissolved. The hydrophobic silicic acid is metered in in powder form, likewise the hydrophilic silicic acid which according to the alterative operation mode described above is hydrophobized by addition of silicone oil. Alternatively, the silicic acid only and the possibly required silicone oil may be introduced first, and the poly-N-vinylpyrrolidone is then metered in for a defined period of the chlorination via a charging valve or dosage pump. In most cases, however, the combination according to the invention is added to the polyethylene suspension before the start of the chlorination. Additionally, organic peroxides serving as starter may be added to the reaction liquor in known manner.

The chlorination reaction may be carried out for example in two steps. In the first chlorination phase, a stationary reaction temperature of below the maximum melting point of the polyethylene used is chosen, in which phase about half of the chlorine is fed in at a uniform dosage amount per time. This reaction phase being terminated, the process temperature is raised to the maximum melting point of the polyethylene, and the remaining chlorine is reacted.

Alternatively to this two-step process, the chlorination may be carried out according to other known methods: for example, the polyethylene may be chlorinated in three or even more steps, or with a gradually rising temperature profile from the start. In some cases, tempering of the partially chlorinated polyethylene at a temperature above the upper critical melting point of the polyethylene according to the state of the art with and without dosage of chlorine is recommended.

Usually, the chlorination temperatures are in a range of from 60° to 150° C., the maximum pressure being about 6 bar. Relative to the chloropolyethylene, the chlorine amount is in the range of from 10 to 50 weight % and depends on the intended quality of the final product; for example in the case of rubber-like materials it is from 20 to 40 weight %, in that of flame-repellent additives it is from 30 to 50 weight % and in that of thermoplastic rubbers it is from 10 to 30 weight %.

The chlorinated polyethylene is subsequently worked up in known manner. After the liquor is substantially separated, the very finely distributed material is centrifuged and subsequently dried to a moisture content of below 0.1%. By adding corresponding auxiliaries, the thermostability required for further processing is efficiently increased. Moreover, the finest-grain material can be provided with antiblocking agents, for example stearic acid, stearates, silicic acid, finest PVC etc. in order to ensure an optimum storage stability even under critical temperature and pressure strain. One of the advantages of the process of the invention resides in the fact that it allows to chlorinate polyethylenes having a broad quality scope, even those which easily result in agglomerated products. Because of the pronounced agglomeration-inhibiting effect of the dispersing agents system according to the invention, process parameters such as temperature, dosage of chlorine, conversion rate of chlorine etc. can be adjusted essentially in view of the obtention of a maximum product quality.

The following examples illustrate the invention.

EXAMPLE 1

2.5 kg of polyethylene having an average molecular weight of $2.10^5$, a molecular weight distribution of 5.1, a grain size of 90% below 300 μm and an average particle size of 200 μm were suspended at room temperature with 22.5 liters of 15% hydrochloric acid in the presence of 0.7 g of nonylphenolpolyglycol ether in an enamelled 50 liter pressure vessel provided with agitor, and 25 g of a 10% solution (=2.5 g of solids) of poly-N-vinylpyrrolidone having a molecular weight of about 40,000 and a K-value of 31, and 25 g of a hydrophobic silicic acid having a primary particle size of about 30 nm and a specific surface according to BET of about 120 $m^2/g$, obtained by reaction with 2 weight % (relative to silicic acid) of dimethyldichlorosilane were added. After a 15 minutes' agitation, the vessel was repeatedly flushed with nitrogen, subsequently heated to 120° C., and introduction of chlorine was started, the dosage being about 1.3 kg/h. The inner pressure of the vessel was a maximum 4.2 bar. After 1 hour of reaction time, the temperature of the vessel was raised ot 135° C., and chlorination was carried out for a further hour, the maximum pressure not exceeding 5 bar. The total conversion of chlorine was 2.6 kg.

After cooling and depressurizing, the chloropolyethylene formed was mechanically separated from the liquor and centrifuged. Drying was carried out in a fluidized bed at an inlet temperature of about 60° C., and continued until the off-air did not contain HCl gases any more. After comminution of the light aggregates formed by drying, for example in a high-speed mixer, into which simultaneously antiblocking agents such as stearic acid, Ca stearate, finest silicic acid etc. were introduced, a finest-grain chloropolyethylene having a grain fraction of 85% of below 300 μm and an average particle size of 200 μm was obtained. The highly elastic material had a surface hardness (Shore A) of 55° and an impact resilience of 30%. A mixture with PVC (K-value 65) in a weight ratio of 10:90 remained stable under vibration and shaking on transport and processing and yielded extrudates having a homogeneous quality, for example an impact strength, notched, at 20° C. of 30 $Nmm/mm^2$ and a ball indentation hardness of 95 $N/mm^2$ (30 sec.).

EXAMPLE 2

Operations were as in Example 1, however, a polyethylene having an average molecular weight of $1.2 \cdot 10^5$, a molecular weight distribution of 6, a grain size of 80% below 300 μm and an average particle size of 160 μm was used. The additives according to the invention were 125 g of a 10% solution of poly-N-vinylpyrrolidone (molecular weight $7 \cdot 10^5$, K-value 95) in water, 2.5 g of hydrophobic silicic acid (treatment with trimethyl-monochlorosilane, specific surface 130 $m^2/g$). The first chlorination step was carried out at 115° C., the second one at 130° C. $Cl_2$ was dosed at a rate of 1.2 kg/h, the total conversion of chlorine amounted to 3 kg. The chloropolyethylene obtained had a chlorine content of 37%, a surface hardness of 49° (Shore A), and an impact resilience of 22%. The amount of fine grain below 300 μm was 76%, the average particle size was 160 μm.

EXAMPLE 3

Operations were as in Example 1, however, a polyethylene having an average molecular weight of $1.8 \times 10^5$, a molecular weight distribution of 12, a grain size of 70% below 300 μm and an average particle size of 200 μm was used.

The additives according to the invention were 150 g of a 10% solution of poly-N-vinylprrolidone (molecular weight about 40,000, K-value 31) in water, 7.5 g of a silicic acid having a primary particle size of 12 nm and a specific surface of 210 $m^2/g$ and hydrophobized by addition of 0.75 g of silicone oil (dimethyl-polysiloxane, average molecular weight about 30,000). The first chlorination step was carried out at 125° C., the second one at 138° C. Chlorine was dosed at a rate of about 1.3 kg/h, the total chlorine conversion was 3.5 kg.

The chloropolyethylene obtained had a chlorine content of 41%, a surface hardness (Shore A) or 45° and an impact resilience of 31%. The amount of grain below 300 μm was 65%, the average particle size was 200 μm.

EXAMPLE 4

2.5 kg of polyethylene having an average molecular weight of $6 \cdot 10^4$, a molecular weight distribution of 6.5, a grain size of 82% below 300 μm and an average particle size of 200 μm were suspended at room temperature with 30 l of water in the presence of 0.7 g of nonylphenyl-polyglycol ether in an enamelled 50 liter pressure vessel provided with agitator, and 0.4 g of dibenzoyl peroxide were added. Subsequently, 300 g of a 10% poly-N-vinylprrolidone solution in water were added to the suspension; the dissolved polymer having an average molecular weight of about 40,000 and a K-value of 31. Furthermore, 180 g of hydrophobic silicic acid having a primary particle size of about 2.0 nm and a specific surface of 150 $m^2/g$, prepared by surface treatment with 2 g of dimethyl-dichlorosilane, were added. After a 15 minutes' agitation, the vessel was repeatedly flushed with nitrogen, subsequently heated to 110° C., and feeding of chlorine at a dosage rate of 1.2 kg/h was started. The inner pressure of the vessel was a maximum 5.4 bar. After a reaction time of 1 hour, the temperature was raised to 128° C., and chlorination was continued. The total chlorine conversion was 3 kg. The product was worked up as described in Example 1 and had the following characteristics:

| | |
|---|---|
| Chlorine content | 37.5% |
| surface hardness (Shore A) | 47° |
| impact resilience | 15% |
| grain size below 300 μm | 80% |
| average particle size | 200 μm |

COMPARATIVE EXAMPLE 1

Operations were as in Example 3, however, neither poly-N-vinylpyrrolidone nor hydrophobic (hydrophobized) silicic acid were added.

Already during the chlorination, the batch agglomerated heavily and after work-up contained no fine grains below 300 μm; the particle size was 1 mm and more. The surface hardness (Shore A) was 65°, the impact resilience 18%. The product was unfit for blending with, for example, finely divided PVC, because the mixture was partially disintegrated by vibration and shaking on transport and processing, which resulted in inhomogeneous extrudates.

COMPARATIVE EXAMPLE 2

Operations were as in Comparative Example 1, however, the batch contained 150 g of a 10% poly-N-vinylpyrrolidone solution in water (average molecular weight about 40,000, K-value 31). No fine grains were obtained, the average particle size was above 0.5 mm. The surface hardness was 67° (Shore A), the impact resilience had dropped to 14%. Due to the coarse grain, the material was unfit for blending with finest-grain polyethylene, polypropylene or PVC. Such combinations were disintegrated by mechanical motions on transport and processing, which resulted in constantly changing properties, for example of extrudates (for example impact strength, notched; ball indentation hardness).

COMPARATIVE EXAMPLE 3

Operations were as in Comparative Example 1, however, the batch contained hydrophobized silicic acid according to Example 3, that is, in one case 7.5 g and in another 22.5 g.

Also in these two cases no fine grain was obtained; the particle sizes were above 1 mm, the surface hardness was 63° (Shore A), and the impact resilience 8%.

What is claimed is:

1. Chloropolyethylene having an average molecular weight $\overline{M}_w$ of from $3.3 \times 10^4$ to $12 \times 10^6$, a chlorine content of from 10 to 50 weight %, a residual crystallinity of from 0 to 40%, a surface hardness of from 35° (Shore A) to 55° (Shore D), an impact resilience of from 5 to 40%, and an average particle size of from 150 to 500 μm, wherein the average particle diameter of the chloropolyethylene differs from that of the starting polyethylene by 15% at most.

2. Chloropolyethylene as claimed in claim 1, wherein the average particle diameter of the chloropolyethylene differs from that of the starting polyethylene by a maximum 4 to 12%.

3. Chloropolyethylene as claimed in claim 1, wherein the average particle size is from 150 to 300 μm.

4. Shaped articles manufactured from the chloropolyethylene as claimed in claim 1.

5. A storage-stable composition comprising particulate chloropolyethylene as claimed in claim 1 blended with at least one substance selected from:

a filler, a polymer which is plasticized by said chloropolyethylene, an antiblocking agent, an antioxidant, a stabilizer, a pigment, a dyestuff, or a processing agent.

6. A composition as claimed in claim 5, wherein the composition contains a polymer which is plasticized by said chloropolyethylene, and the polymer is rigid or plasticized PVC.

7. Chloropolyethylene having an average molecular weight $\overline{M}_w$ of from $3.3 \times 10^4$ to $12 \times 10^6$, a chlorine content of from 10 to 50 weight %, a residual crystallinity of from 0 to 40%, a surface hardness of from 35° (Shore A) to 55° (Shore D), an impact resilience of from 5 to 40%, and an average particle size of from 150 to 500 μm, wherein the average particle diameter of the chloropolyethylene differs from that of the starting polyethylene by 15% at most, said chloropolyethylene having been obtained by chlorination of polyethylene in aqueous phase in the presence of a dispersing agent, said dispersing agent comprising a combination of poly-N-vinylpyrrolidone and hydrophobic silicic acid.

* * * * *